United States Patent
Wilby et al.

(10) Patent No.: US 9,588,223 B2
(45) Date of Patent: Mar. 7, 2017

(54) PHASE CENTER ALIGNMENT FOR FIXED REPETITION RATE SYNTHETIC APERTURE SYSTEMS

(71) Applicant: RAYTHEON COMPANY, Waltham, MA (US)

(72) Inventors: Andrew Wilby, Torrance, CA (US); Jonathan Pearson Magoon, Anaheim, CA (US)

(73) Assignee: RAYTHEON COMPANY, Waltham, MA (US)

( * ) Notice: Subject to any disclaimer, the term of this patent is extended or adjusted under 35 U.S.C. 154(b) by 248 days.

(21) Appl. No.: 14/481,515

(22) Filed: Sep. 9, 2014

(65) Prior Publication Data
US 2016/0069996 A1    Mar. 10, 2016

(51) Int. Cl.
| G01S 15/89 | (2006.01) |
| G01S 15/60 | (2006.01) |
| G01S 7/28 | (2006.01) |
| G01S 7/523 | (2006.01) |
| G01S 13/90 | (2006.01) |

(52) U.S. Cl.
CPC ............ *G01S 15/8904* (2013.01); *G01S 7/28* (2013.01); *G01S 7/523* (2013.01); *G01S 13/90* (2013.01); *G01S 13/9094* (2013.01); *G01S 15/60* (2013.01)

(58) Field of Classification Search
CPC ........ G01S 7/28; G01S 15/60; G01S 15/8904; G01S 7/523; G01S 13/9094; G01S 13/90
See application file for complete search history.

(56) References Cited

U.S. PATENT DOCUMENTS

| 6,426,718 B1* | 7/2002 | Ridgway | G01S 13/534 342/159 |
| 2006/0239119 A1 | 10/2006 | Hartka et al. | |
| 2016/0069996 A1* | 3/2016 | Wilby | G01S 7/28 367/88 |

FOREIGN PATENT DOCUMENTS

EP    1 241 487 A1    9/2002

OTHER PUBLICATIONS

Bellettini et al., "Theoretical Accuracy of Synthetic Aperture Sonar Micronavigation Using a Displaced Phase-Center Antenna," IEEE Journal of Oceanic Engineering, 27(4):780-789, 2002.
Callow, Hayden J., "Signal Processing for Synthetic Aperture Sonar Image Enhancement," Thesis presented in Electrical and Electronic Engineering at the University of Canterbury, Christchurch, New Zealand, 2003, 252 pgs.
Campbell et al., "Concepts for Synthetic Aperture Sonar Performance Prediction and Mission Planning," Applied Signal Technology, Inc., pp. 1-8.

(Continued)

*Primary Examiner* — Daniel Pihulic
(74) *Attorney, Agent, or Firm* — Lewis Roca Rothgerber Christie LLP

(57) ABSTRACT

A system for adjusting phase centers of a receiving array in real time. In one embodiment, a transmitter transmits a sequence of pings. Receiving elements are grouped into staves and summed prior to subsequent processing, and the groups are selected so that the phase center on a ping is substantially in the same location as another phase center on a previous ping.

17 Claims, 4 Drawing Sheets

(56) References Cited

OTHER PUBLICATIONS

Sheriff, "Synthetic Aperture Beamforming With Automatic Phase Compensation For HIGII Frequency Sonars", Institute of Electrical And Electronics Engineers, Proceedings of the Symposium on Autonomous Underwater Vehicle Technology, Washington, Jun. 2-3, 1992, vol. -, Jun. 3, 1992 (pp. 236-245).
Written Opinion of the International Searching Authority for International Application No. PCT/US2015/039823 filed Jul. 9, 2015, Written Opinion of the International Searching Authority mailed Feb. 24, 2016 (6 pgs.).
International Search Report for International Application No. PCT/US2015/039823, filed Jul. 9, 2015, International Search Report dated Feb. 16, 2016 and mailed Feb. 24, 2016 (5 pgs.).

\* cited by examiner

PHASE CENTER ALIGNMENT FOR FIXED REPETITION RATE SYNTHETIC APERTURE SYSTEMS

STATEMENT REGARDING FEDERALLY SPONSORED RESEARCH OR DEVELOPMENT

This invention was made with U.S. Government support under contract No. N61331-12-G-0001-0004 awarded by the U.S. Navy. The U.S. Government has certain rights in this invention.

BACKGROUND

1. Field

One or more aspects of embodiments according to the present invention relate to a system for synthetic array sensing, and more particularly to a system for maintaining ping-to-ping alignment of phase centers in a synthetic array sonar.

2. Description of Related Art

In a system using a directive sensor, be it a RADAR, a sonar or a telescope, the ability of the sensor to collect data from a given direction and to discriminate against data arriving from a different direction is a function of the effective aperture of the receiver. The greater the effective size of a receiver, the more tightly a directional beam can be formed.

In certain applications, there are limits on the physical size of a receiver, set by the mechanical constraints of the platform to which the sensor is to be attached. For example, it may not be practical to fit a long radar antenna, e.g., an array of receiving elements, on the side of a relatively short aircraft fuselage. Synthetic aperture beam-forming mitigates the limitations related to this constraint, allowing higher resolution images to be obtained than are possible with a single physical antenna. The process of synthetic aperture beam-forming may be used in the field of RADAR and sonar processing. In a synthetic aperture sonar (SAS) system, or a synthetic aperture RADAR (SAR), an antenna is moved through the water or air, while observing a static scene. The data from successive transmitted pulses, or "pings," is combined coherently to create an image equivalent to that which could have been obtained from a single array with an aperture the same as the distance traveled over the period of coherent summation.

To coherently combine data from successive pings, it is necessary to have an accurate estimate of the position and attitude of the array at each ping, and to correctly map the trajectory of the sensor during the acquisition cycle. In the case of SAR, navigational aids, such as a global positioning system (GPS) signal, together with inertial sensors, typically derived from rate gyro and accelerometer data combined in a Kalman filter, provide an aided inertial navigation solution with the degree of precision necessary to allow coherent combination. Underwater, in the case of SAS, GPS information is not available, and the comparatively slow wave speed, when compared to the vehicle speed, means that data obtainable from even an aided inertial navigation system is not good enough to provide the precise (sub wavelength) navigation required for coherent combination.

In an SAS system, displaced phase center antenna (DPCA) processing, which may also be referred to as redundant phase center (RPC) processing, may be used to provide high accuracy navigation. In such a system, contiguous sets of receiving elements may be grouped into staves, and the signals from all of the receiving elements in each stave summed into respective stave outputs, for subsequent processing of the returns from each ping. Pings may be timed, based on the forward motion of the vehicle, to cause the phase center for one stave, i.e., the mid-point between that stave and the transmitter, for one ping, to be in the same (nominal) position as the phase center for another stave in the array on the next ping. This may require adjusting the interval between pings as the vehicle velocity changes, a requirement that can be burdensome if multiple sensors on the vehicle must also be synchronized to avoid interference, e.g., if the other sensors require that the repetition rate of the pings be constant. Thus, there is a need for a system and method for achieving phase center alignment without constraining the interval between pings, and, in particular, compatible with a fixed repetition rate.

SUMMARY

In one embodiment of a system for adjusting phase centers of a receiving array in real time, a transmitter transmits a sequence of pings. Receiving elements are grouped into staves and summed prior to subsequent processing, and the groups are selected so that the phase center on a ping is substantially in the same location as another phase center on a previous ping.

According to an embodiment of the present invention there is provided a vehicle-mounted synthetic aperture system including: a ping transmitter configured to transmit a series of pings; an array of receiving elements configured to receive a ping return for each transmitted ping; a plurality of acquisition circuits, each connected to one of the receiving elements and configured to produce digital sampled data at a plurality of points in time; a processing unit configured to receive the sampled data; and the processing unit being configured to receive real-time navigation state data and configured to form a plurality of stave sums, each stave sum being the sum of sampled data corresponding to a contiguous subset of the receiving elements; the processing unit being configured to select the contiguous subset, based on the navigation state data, to form a phase center for a ping at substantially the same point as a phase center for a previous ping.

In one embodiment, the processing unit includes a first in-first-out circuit (FIFO) configured to store the digital sampled data.

In one embodiment, the processing unit includes a summation circuit connected to the FIFO, the summation circuit configured to form a plurality of stave sums from digital sampled data received from the FIFO.

In one embodiment, the processing unit includes a plurality of FIFOs, each FIFO configured to store digital sampled data from a respective subset of the acquisition circuits.

In one embodiment, the processing unit includes a plurality of first summation circuits, each first summation circuit configured to sum data received from a respective FIFO.

In one embodiment, the processing unit includes a second summation circuit, the second summation circuit configured to sum data received from the first summation circuits.

In one embodiment, the processing unit is configured to receive vehicle velocity data from a navigation calculator, and to estimate the distance the vehicle moved between the ping and the previous ping.

In one embodiment, the processing unit is configured to select the contiguous subset based on the estimated distance moved.

According to an embodiment of the present invention there is provided a method for processing digital sampled data from a plurality of receiving elements in a vehicle-mounted synthetic aperture system, the digital sampled data corresponding to a current ping, the method including: selecting contiguous subsets of the digital sampled data, each contiguous subset corresponding to a contiguous set of receiving elements, and forming the sum of each of the selected contiguous subsets of the digital sampled data, wherein a first contiguous subset, corresponding to a first contiguous set of receiving elements, is selected so that, for the current ping, a phase center of the first contiguous set of receiving elements is located at substantially the same point as a phase center, for a preceding ping, for a second contiguous set of receiving elements.

In one embodiment, the method includes: receiving vehicle velocity data; and integrating the velocity data to estimate the change in the position of the vehicle between the current ping and the preceding ping.

In one embodiment, the integrating of the velocity data includes converting the velocity data from north, east, down, (NED) format, into orthogonal coordinates aligned with axes of the vehicle.

In one embodiment, the selecting of contiguous subsets of the digital sampled data includes: estimating the distance traveled by the vehicle; computing the shift for a contiguous subset of the digital sampled data, relative to a null shift, as a distance; and converting the shift calculated as a distance to a shift calculated as a number of receiving elements.

In one embodiment, the computing of the shift for a contiguous subset of the digital sampled data, relative to a null shift, as a distance, includes evaluating:

$$shift2 \equiv R2' - R2$$

$$shift1 \equiv R1' - R1$$

$$PC1' \equiv \frac{T1 + R1'}{2}$$

$$PC2' \equiv \frac{T2 + R2'}{2}$$

$$PC2' \equiv PC1' + n \; pcSpacing$$

$$T2 + R2 + shift2 = T1 + R1 + shift1 + 2n \; pcSpacing$$

$$shift2 = -(T2 - T1) - (R2 - R1) + shift1 + 2n \; pcSpacing,$$

and $$shift2 = 2n \; pcSpacing - 2distAdv + shift1,$$

wherein: R1 and R2 are the receiver positions of a stave on the preceding ping and the current ping, respectively, R1' and R2' are the shifted receiver positions of the stave on the preceding ping and the current ping, respectively, T1 and T2 are the transmitter positions on the preceding ping and the current ping, respectively, PC1' and PC2' are the shifted positions of the phase centers of the stave on the preceding ping and the current ping, respectively, shift2 is the shift, as a distance, to be used on the current ping, shift1 is the shift, as a distance, used on the previous ping, distAdv is the distance advanced by the vehicle between the previous ping and the current ping, and pcSpacing is the phase center spacing across the aperture, and n is an integer.

In one embodiment, n is chosen to minimize the magnitude of shift2.

In one embodiment, the method includes calculating a non-integer value corresponding to n, according to $$n_{fractional} = \frac{1}{pcSpacing}\left(distAdv - \frac{shift1}{2}\right).$$

In one embodiment, the method includes calculating n according to the equation $$n = \text{round}(n_{fractional}).$$

In one embodiment, the method includes calculating the shift as a number of receiving array elements, according to the equation:

$$elementShift = \text{round}\left(\frac{shift2}{elementSpacing}\right).$$

BRIEF DESCRIPTION OF THE DRAWINGS

Features, aspects, and embodiments are described in conjunction with the attached drawings, in which:

FIG. 2A is a diagram of a receiving array at a first point in time corresponding to a first ping, showing receiving elements, and staves formed by summing the signal from groups of receiving elements, according to an embodiment of the present invention;

FIG. 2B is a diagram of a receiving array at a second point in time corresponding to a second ping, showing receiving elements, and staves formed by summing the signal from groups of receiving elements, according to an embodiment of the present invention;

DETAILED DESCRIPTION

The detailed description set forth below in connection with the appended drawings is intended as a description of exemplary embodiments of a system and method for phase center alignment for fixed repetition rate synthetic aperture systems provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In one embodiment, a SAS transmitter mounted on an underwater vehicle transmits a series of pings, each of which is a frequency modulated pulse of sound waves. Each ping is reflected from one or more targets, e.g., objects in the water or on the sea bed, and the returns are received by a receiving array composed of receiving elements. To achieve accurate phase center alignment, the along-array-axis, i.e., longitudinal, or "X" component of vehicle velocity may be integrated after a ping is transmitted, and the next ping put in the water when the vehicle has moved forward by a distance corresponding to an integral number times the phase center separation, where the phase center separation is one-half of the separation between the midpoints of adjacent staves on the receiving array. This process is effective, but leads to one serious limitation in the operation of the vehicle system, i.e., that the repetition rate of transmitted sonar pings is not constant, but varies with the speed of the vehicle. While this is sometimes acceptable, where there are multiple sensors deployed on a single vehicle, and where sensors are required to be synchronized to reduce mutual interference, the requirement that every vehicle sensor is to be slaved to the SAS is sometimes not possible and, in some cases, the SAS needs to be operated at a fixed repetition rate, or slaved to some external clock, which is not related to vehicle speed. In these cases, the quality of the cross correlation achieved in the SAS processing is impaired by the imprecise location of the phase centers, and the knowledge of position and hence the focus of the SAS image is correspondingly reduced.

Embodiments of the present invention remove the requirement that repetition rates be slaved to the advance speed of the vehicle, allowing good correlations to be achieved even when a fixed repetition interval is required to allow operation of the various sensors on board the platform without degrading mutual interference performance.

Figure 1:
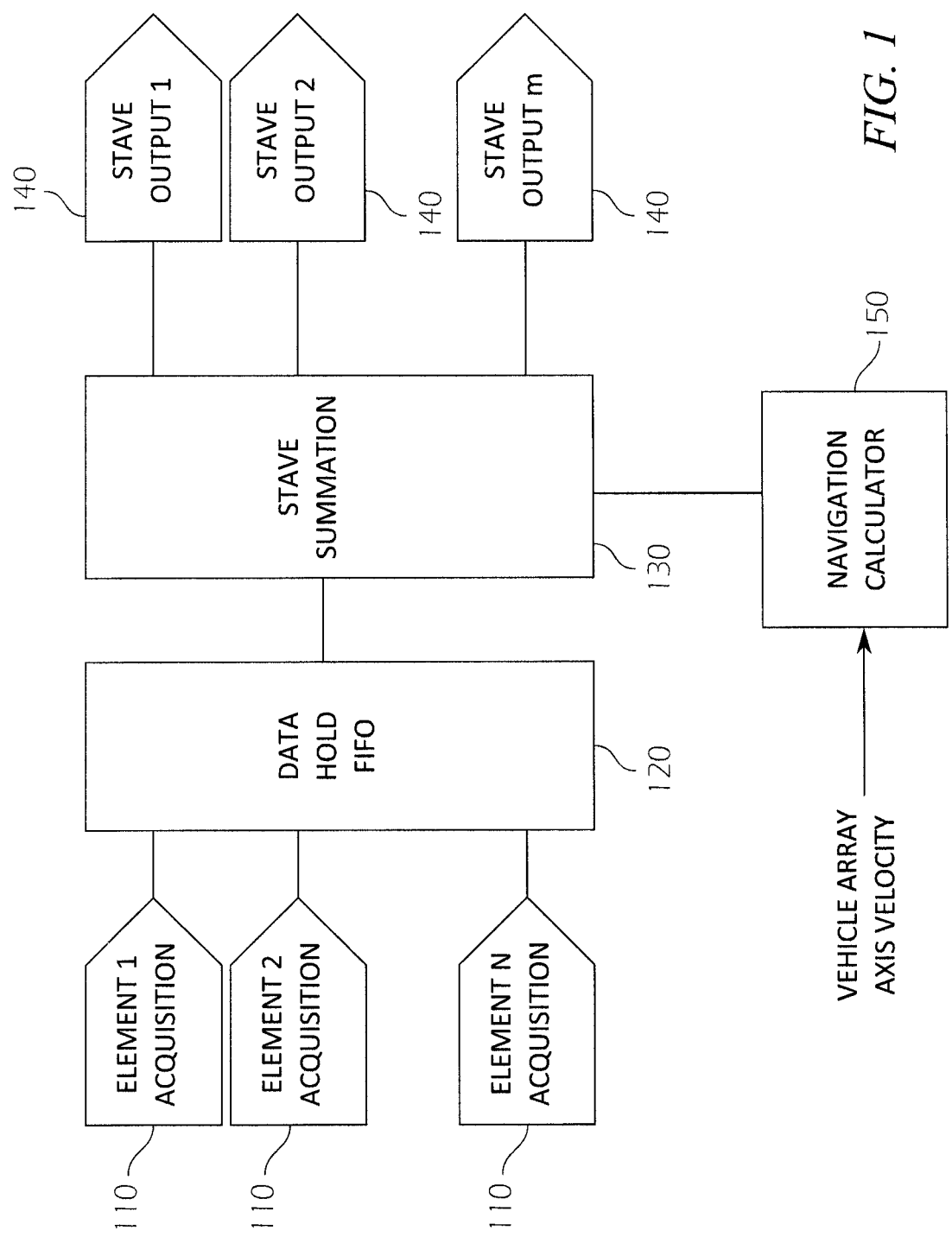
FIG. 1 is a block diagram of a system for providing phase center alignment according to an embodiment of the present invention.

Each receiving element is a piezoelectric transducer, configured to detect pressure fluctuations in water corresponding to an incident acoustic signal, and to convert the detected pressure fluctuations to an electrical signal. Referring to FIG. 1, the electrical signal from each receiving element is processed by a respective element acquisition circuit 110, which may include, for example, one or more amplifiers, an analog to digital converter (ADC) and a downsampling circuit. The output of the element acquisition circuit 110 is a series of digital complex numbers, uniformly spaced in time, each of which represents the amplitude and phase of a received wave. The element acquisition circuits 110 are connected to a data hold first-in, first-out circuit (FIFO) 120. The outputs of the element acquisition circuits 110 are synchronized, so that at each processing time step, each element acquisition circuit 110 delivers a complex number to the data hold FIFO 120. The set of complex numbers forms a vector of data values, or "data vector," which is input to the data hold FIFO 120, the data vector having one complex element for each receiving element. The data hold FIFO 120 stores a sequence, or "queue" of data vectors, so that the data vector output from the data hold FIFO 120 at any point in time corresponds to acoustic signals received by the receiving elements at some time in the past.

The output of the data hold FIFO 120 is connected to a stave summation block 130. The stave summation block 130 sums contiguous subsets of the elements of each data vector into stave outputs 140. Each contiguous subset corresponds to a contiguous set of receiving elements. The contiguous subsets selected to form the staves (and, thus, the locations on the array of the staves) may change from ping to ping, providing alignment of the phase centers from ping to ping. A navigation calculator 150 provides navigation state information to the stave summation block, allowing the stave summation block to use estimates of the vehicle's position in selecting the subsets to form the staves.

For example, in one embodiment in which the receiving array has 360 array elements, each stave may be a sum of 10 data vector elements, with, for one ping, stave 0 being the sum of the data vector elements corresponding to the first 10 receiving elements, i.e., receiving elements 0 to 9, stave 1 being the sum of the data vector elements corresponding to receiving elements 10 to 19, etc., to form a total of 36 staves. This configuration, in which the receiving array is divided into m staves of N receiving elements each (in this case, with m=36 and N=10), such that the first stave (stave 0) contains the first N receiving elements, the second stave contains the next N receiving elements, and so on, is referred to herein as the "null shift" configuration, or simply as a "null shift."

For another ping the staves may be shifted, with, for example, stave 0 being the sum of data vector elements corresponding to receiving elements 3 to 12, stave 1 being the sum of the data vector elements corresponding to receiving elements 13 to 22, etc. For this shift (referred to as an "element shift" of 3) from a null shift configuration, in an embodiment with 360 receiving elements, the stave summation block 130 may form 35 staves, each stave being a sum of 10 data vector elements, and two stave fragments, each containing fewer than 10 receiving elements, one at each end of the receiving array. The stave outputs are connected to further processing blocks for implementing DPCA or RPC and other SAS processing.

Each stave, i.e., each contiguous set of receiving elements summed in the stave summation block 130, corresponds to a phase center, which is defined as the midpoint between (i) the center of the stave, i.e., of the contiguous set of receiving elements data from which are summed in the stave summation block 130, and (ii) the transmitter. In one embodiment, to achieve good correlation between successive pings in a DPCA or RPC system, at least one phase center for one ping is in substantially the same location (i.e., to within 10 or 20 percent of the spacing between phase centers) as a phase center on the previous ping.

Elements of embodiments of the present invention may be implemented using one or more processing units. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB. Thus, in the embodiment of FIG. 1, the combination of the data hold FIFO 120 and the stave summation block 130 forms a processing unit.

Figures 2A, 2B:
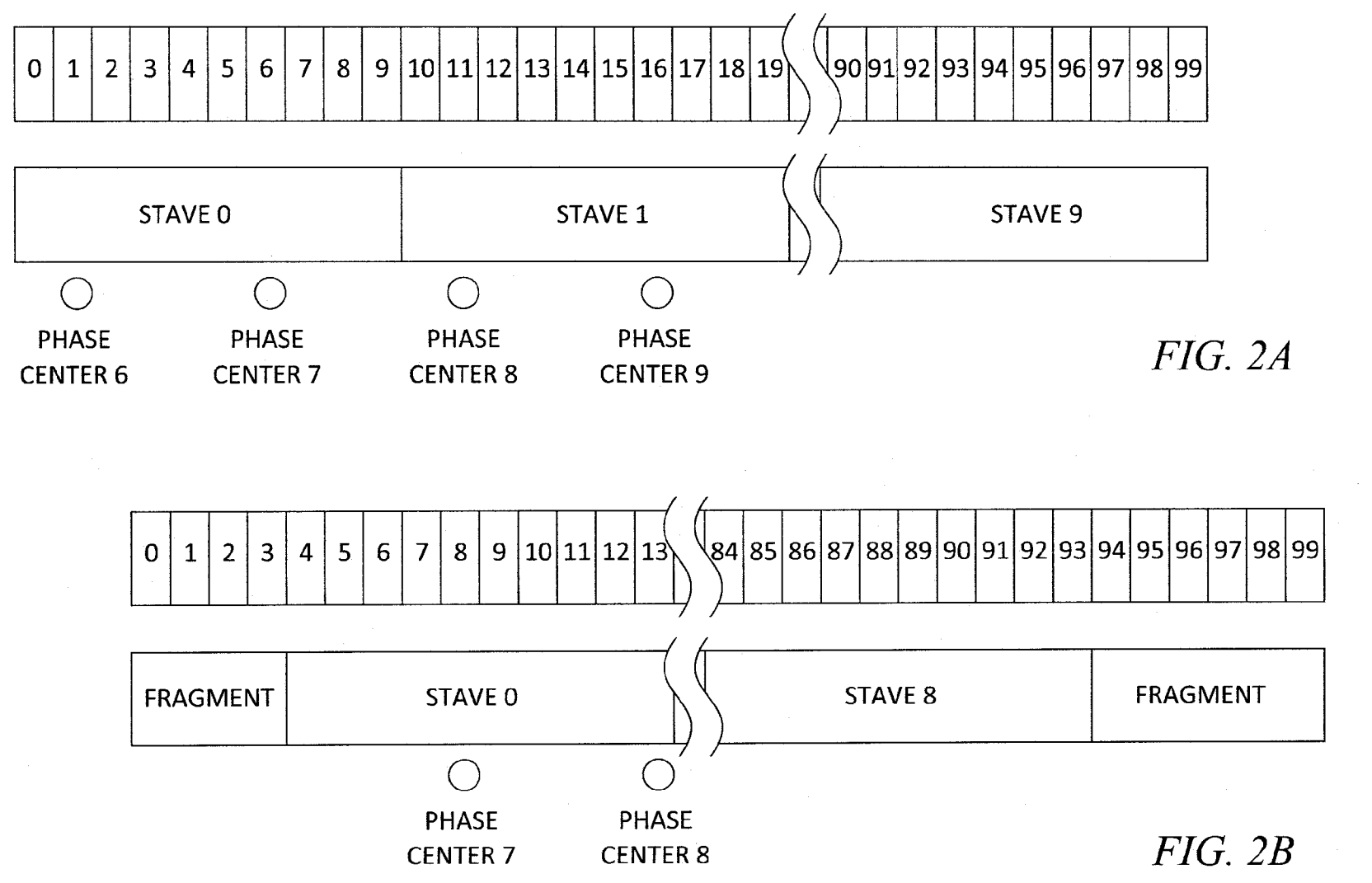

In one embodiment, to achieve alignment of phase centers between successive pings, the locations of the phase centers are adjusted in real time by suitable selection of the subsets of data vector elements forming each stave. In one illustrative example, referring to FIG. 2A, for one ping the phase center ("PHASE CENTER 9" in FIG. 2A) for stave 9 (which, on that ping, contains elements 90-99) is aligned approximately with element 16, and, referring to FIG. 2B, for a second, subsequent ping, the vehicle has advanced by a distance corresponding to three elements. For the second ping, the vehicle has traveled a non-integral number of phase centers between transmissions; this may be the case when the SAS system does not control the interval between pings, and the alignment varies between pings as the speed of the vehicle alters. For the second ping, stave 8 may be formed by summing the data vector elements corresponding to receiving elements 84-93. Because the vehicle has advanced by 3 elements between the first ping and the second ping, this selection of the subsets of data vector elements forming the staves for the second ping results in the phase center for stave 8 on the second ping falling at the same point as the phase center for stave 9 on the first ping. A receiving array with 100 elements is shown in FIG. 2A, but the number of receiving elements may be smaller or greater; in one embodiment 360 receiving elements are used.

Data from these two successive observations of nominally the same piece of seabed can then be cross-correlated to resolve lateral motion of the array between pings. Using the heading sensor of the vehicle, the component of the motion which is due to sway, and the component of the motion which is due to yaw, can be resolved and it is possible to refine the knowledge of the vehicle trajectory to the point where coherence is restored and SAS beam-forming can be undertaken. In general, having a good alignment of the overlapping phase centers is advantageous for obtaining a high signal to noise ratio in the correlation result, as the cross correlation product drops, rather quickly, with locational error.

In one embodiment, an alignment accuracy of no worse than $100/(2*N)$ % is achieved, where N is the number of elements per stave. The choice of N is a system parameter which affects power and electronic and array complexity, and which also provides a figure for the quality of the cross correlation which can be expected and hence the quality of the trajectory refinement which can be achieved.

In one embodiment, performing the selection of elements to be summed, to form each stave, includes computing the distance traveled by the vehicle between one ping and the preceding ping, computing the shift as a distance (e.g., in meters), and computing the element shift, i.e., the shift measured as a offset, measured as a number of receiving elements, from the null shift configuration.

To compute the distance traveled by the vehicle between one ping and the preceding ping, the numerical integral of the longitudinal velocity, Vx, as estimated by the inertial navigation system (INS), is calculated between two ping times, to form an estimate of the displacement, in the longitudinal direction, of the vehicle between the two pings. If the available navigation data are in north, east, down, (NED) format, the data are first rotated into XYZ coordinates (i.e., orthogonal coordinates with the "X" axis parallel to the longitudinal axis of the vehicle and the array) to form Vx. The shifted phase center location of one stave, e.g., stave 0, on the previous ping is computed, and the desired phase center location of that stave (stave 0) is computed for the current ping. Next, the shift required, based on the longitudinal displacement, is computed to obtain the correct phase center alignment on the current ping. The shift used for the current ping is then used for stave summations and also stored for use in the calculation of the shift required for the next ping.

Figure 3:
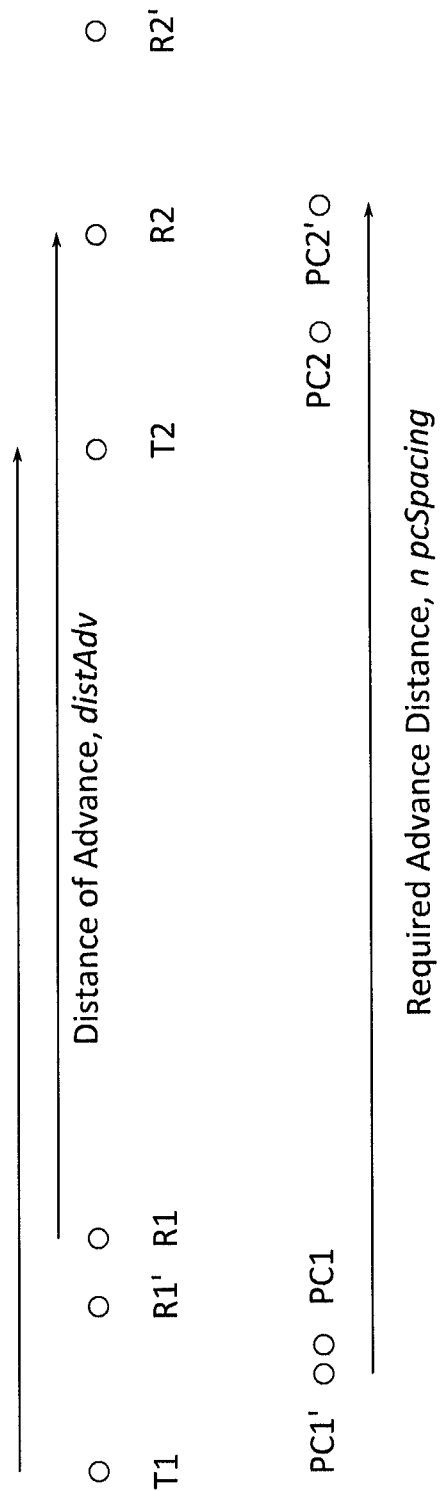
FIG. 3 is a diagram showing transmitter and receiver positions, and the corresponding phase center positions, at two points in time corresponding to a first ping and a second ping, according to an embodiment of the present invention.

Referring to FIGS. 3, T1 and T2 are the transmitter positions on ping 1 and 2, respectively, R1 and R2 are the positions of a given stave on ping 1 and 2, respectively, and R1' and R2' are the shifted positions of a given stave on ping 1 and 2, respectively. PC1, PC1', PC2, and PC2' are the unshifted and shifted phase center locations for a given stave on ping 1 and 2 respectively. The longitudinal displacement, or "distance of advance," as computed using the INS velocities, is indicated with the symbol distAdv, and the symbol pcSpacing denotes the spacing between adjacent phase centers, i.e., one-half of the center-to-center separation of adjacent staves. The shifted stave position on ping 2 is then chosen so that the separation between PC1' and PC2' is equal to n times pcSpacing, with n being an integer chosen to minimize the required shift.

To compute the shift required on ping 2, the following equations are evaluated:

$$shift2 \equiv R2' - R2$$

$$shift1 \equiv R1' - R1$$

$$PC1' \equiv \frac{T1 + R1'}{2}$$

$$PC2' \equiv \frac{T2 + R2'}{2}$$

$$PC2' \equiv PC1' + n\ pcSpacing$$

$$T2 + R2 + shift2 = T1 + R1 + shift1 + 2n\ pcSpacing$$

$$shift2 = -(T2 - T1) - (R2 - R1) + shift1 + 2n\ pcSpacing,$$

and $$shift2 = 2n\ pcSpacing - 2distAdv + shift1,$$

where distAdv is estimated by integrating INS velocity, pcSpacing is a characteristic of the receiving array, n is chosen to make shift2 as close to zero as possible, and shift1 is the shift as computed and used on the previous ping.

The value of n is first calculated as a non-integer (e.g., a floating-point or fixed-point number), as the value for which shift2 equals zero:

$$2n_{fractional} pcSpacing = 2distAdv - shift1$$

$$n_{fractional} = \frac{1}{pcSpacing}\left(distAdv - \frac{shift1}{2}\right)$$

This value is then converted to an integer by rounding to the closest integer value:

$$n = \text{round}(n_{fractional})$$

and shift2, as a distance, is calculated using:

shift2=2n pcSpacing−2distAdv+shift1

Finally, the element shift is computed using:

$$elementShift = \text{round}\left(\frac{shift2}{elementSpacing}\right)$$

and elementShiftToSend = mod(elementShift, numElementsPerStave)

where elementSpacing is the center-to-center separation of elements in the array, and numElementsPerStave is the number of elements summed to form each stave.

Depending on the distance of advance, the shift on the previous ping, and the element and phase center spacing, the element shift resulting from this calculation may be zero (i.e., it may correspond to the null shift configuration), or it may be a non-zero, non-integral multiple of N, the number of receiving elements in a stave.

Figure 4:
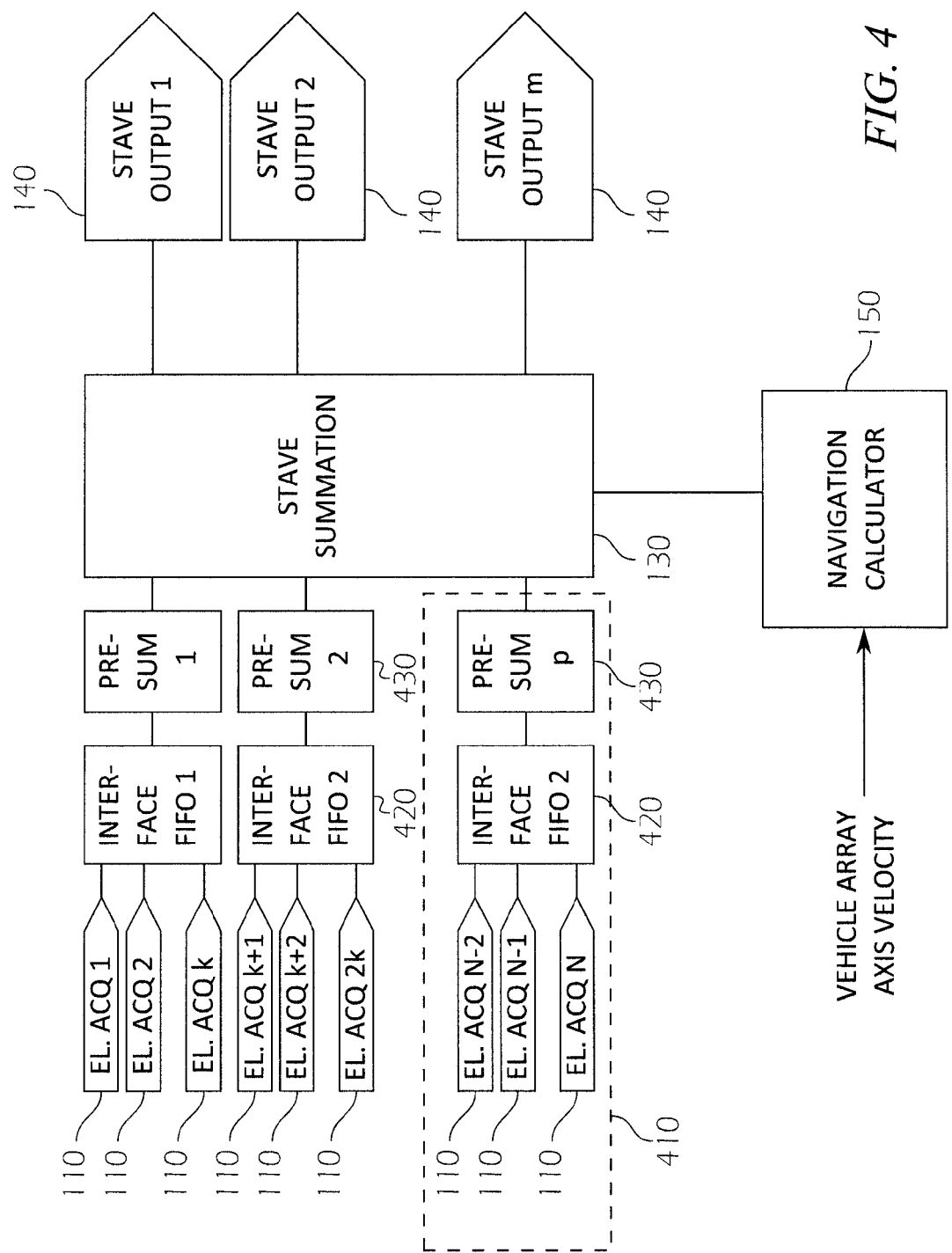
FIG. 4 is a block diagram of a system for providing phase center alignment using a plurality of interface boards, according to an embodiment of the present invention.

Referring to FIG. 4, in one embodiment, the element acquisition circuits 110 are grouped, in groups of k element acquisition circuits 110, onto p boards, e.g., printed wiring boards (PWBs), referred to herein as interface boards 410, for ease of fabrication and assembly. Each interface board 410 includes k element acquisition circuits 110, an interface FIFO 420, and a summation circuit referred to as a pre-sum circuit 430. Each pre-sum circuit 430 sums the data at the output of the corresponding interface FIFO 420 into staves to the extent that data corresponding to entire staves are present within the interface FIFO 420, and into partial staves otherwise. The partial staves are then summed into staves in the stave summation block 130. In this embodiment, the interface FIFOs 420, the pre-sum circuits 430, and the stave summation block 130 form a processing unit. The navigation calculator provides navigation data based on which the pre-sum circuits select which receiving elements to group into staves, or the selection may be made by another block, again based on the navigation data, and communicated to the pre-sum circuits.

In one embodiment, a system with 360 receiving elements includes 9 interface boards 410 (i.e., p=9), each with 40 channels (i.e., k=40), so that each interface board 410 receives data from 40 receiving elements. Each stave includes 5 receiving elements, and each interface board 410 outputs 9 sums, of which either (i) 8 are complete stave sums and one is empty (if the element shift is zero) or (ii) 7 are complete stave sums and two are partial stave sums.

For example, if the element shift is 1, then the first output sum of the first interface board (i.e., channel 0) will consist of (the stave fragment consisting of) the data from receiving element 0, the second output sum of the first interface board (i.e., channel 1) will consist of the sum of input channels 1 through 5, channel two will consist of the sum of input channels 6 through 10, and so on. The $9^{th}$ output sum of the first interface board (i.e., channel 8) will consist of the sum of input channels 36 through 39. This partial stave, consisting of data from receiving elements 36-39, is summed, in the stave summation block 130, with the partial stave consisting of data from receiving element 40, which forms the first output sum of the second interface board.

The summation occurring in the interface boards 410 reduces the data bandwidth needed between the interface boards 410 and the stave summation block 130, and decreases the number of operations needed in the stave summation block 130. In one embodiment, the sums in the interface boards 410 are calculated by dedicated circuits, e.g., field programmable gate arrays (FPGAs) and the operations in the stave summation block 130 are performed by a central processing unit (CPU) executing instructions stored in a non-transitory storage medium.

Although limited embodiments of a system and method for phase center alignment for fixed repetition rate synthetic aperture systems have been specifically described and illustrated herein, many modifications and variations will be apparent to those skilled in the art. Accordingly, it is to be understood that the system and method for phase center alignment for fixed repetition rate synthetic aperture systems employed according to principles of this invention may be embodied other than as specifically described herein. The invention is also defined in the following claims, and equivalents thereof.

What is claimed is:

1. A vehicle-mounted synthetic aperture system comprising:
   a ping transmitter configured to transmit a series of pings;
   a physical array of receiving elements configured to receive a ping return for each transmitted ping;
   a plurality of acquisition circuits, each connected to one of the receiving elements and configured to produce digital sampled data at a plurality of points in time; and
   a processing unit configured to receive the sampled data,
   the processing unit being configured to receive real-time navigation state data and configured to form a plurality of stave sums, each stave sum being the sum of sampled data corresponding to a contiguous subset of the receiving elements;
   the processing unit being configured to select the contiguous subset, based on the navigation state data, to form a phase center for a ping at substantially the same point as a phase center for a previous ping.

2. The synthetic aperture system of claim 1, wherein the processing unit includes a first-in first-out circuit (FIFO) configured to store the digital sampled data.

3. The synthetic aperture system of claim 2, wherein the processing unit includes a summation circuit connected to the FIFO, the summation circuit configured to form a plurality of stave sums from digital sampled data received from the FIFO.

4. The synthetic aperture system of claim 1, wherein the processing unit includes a plurality of FIFOs, each FIFO configured to store digital sampled data from a respective subset of the acquisition circuits.

5. The synthetic aperture system of claim 4, wherein the processing unit includes a plurality of first summation circuits, each first summation circuit configured to sum data received from a respective FIFO.

6. The synthetic aperture system of claim 5, wherein the processing unit includes a second summation circuit, the second summation circuit configured to sum data received from the first summation circuits.

7. The synthetic aperture system of claim 1, wherein the processing unit is configured to receive vehicle velocity data from a navigation calculator, and to estimate the distance the vehicle moved between the ping and the previous ping.

8. The synthetic aperture system of claim 7, wherein the processing unit is configured to select the contiguous subset based on the estimated distance moved.

9. A method for processing digital sampled data from a physical array of receiving elements in a vehicle-mounted synthetic aperture system, the digital sampled data corresponding to a current ping, the method comprising:
   selecting contiguous subsets of the digital sampled data, each contiguous subset corresponding to a contiguous set of receiving elements, and
   forming the sum of each of the selected contiguous subsets of the digital sampled data,
   wherein a first contiguous subset, corresponding to a first contiguous set of receiving elements, is selected so that, for the current ping, a phase center of the first contiguous set of receiving elements is located at substantially the same point as a phase center, for a preceding ping, for a second contiguous set of receiving elements.

10. The method of claim 9, further comprising:
    receiving vehicle velocity data; and
    integrating the velocity data to estimate the change in the position of the vehicle between the current ping and the preceding ping.

11. The method of claim 10, wherein the integrating of the velocity data comprises converting the velocity data from north, east, down, (NED) format, into orthogonal coordinates aligned with axes of the vehicle.

12. The method of claim 9, wherein the selecting of contiguous subsets of the digital sampled data comprises:
estimating the distance travelled by the vehicle;
computing the shift for a contiguous subset of the digital sampled data, relative to a null shift, as a distance; and
converting the shift calculated as a distance to a shift calculated as a number of receiving elements.

13. The method of claim 12, wherein the computing of the shift for a contiguous subset of the digital sampled data, relative to a null shift, as a distance, comprises evaluating:

$$shift2 \equiv R2' - R2$$

$$shift1 \equiv R1' - R1$$

$$PC1' \equiv \frac{T1 + R1'}{2}$$

$$PC2' \equiv \frac{T2 + R2'}{2}$$

$$PC2' \equiv PC1' + n\ pcSpacing$$

$$T2 + R2 + shift2 = T1 + R1 + shift1 + 2n\ pcSpacing$$

$$shift2 = -(T2 - T1) - (R2 - R1) + shift1 + 2n\ pcSpacing,$$

and $$shift2 = 2n\ pcSpacing - 2distAdv + shift1,$$

wherein:
R1 and R2 are the receiver positions of a stave on the preceding ping and the current ping, respectively,
R1' and R2' are the shifted receiver positions of the stave on the preceding ping and the current ping, respectively,
T1 and T2 are the transmitter positions on the preceding ping and the current ping, respectively,
PC1' and PC2' are the shifted positions of the phase centers of the stave on the preceding ping and the current ping, respectively,
shift2 is the shift, as a distance, to be used on the current ping,
shift1 is the shift, as a distance, used on the previous ping,
distAdv is the distance advanced by the vehicle between the previous ping and the current ping, and
pcSpacing is the phase center spacing across the aperture, and
n is an integer.

14. The method of claim 13, wherein n is chosen to minimize the magnitude of shift2.

15. The method of claim 13, comprising calculating a non-integer value corresponding to n, according to $$n_{fractional} = \frac{1}{pcSpacing}\left(distAdv - \frac{shift1}{2}\right).$$

16. The method of claim 15, comprising calculating n according to the equation n=round($n_{fractional}$).

17. The method of claim 16, comprising calculating the shift as a number of receiving array elements according to the equation:

$$elementShift = round\left(\frac{shift2}{elementSpacing}\right).$$

* * * * *